United States Patent
Geijer Lundin

(10) Patent No.: US 9,641,447 B2
(45) Date of Patent: May 2, 2017

(54) ADAPTIVE RELATIVE BITRATE MANAGER FOR TCP DEPENDING FLOW CONTROL

(75) Inventor: Erik Geijer Lundin, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 483 days.

(21) Appl. No.: 13/978,961

(22) PCT Filed: Jan. 12, 2011

(86) PCT No.: PCT/EP2011/050343
§ 371 (c)(1),
(2), (4) Date: Jul. 10, 2013

(87) PCT Pub. No.: WO2012/095169
PCT Pub. Date: Jul. 19, 2012

(65) Prior Publication Data
US 2013/0294246 A1 Nov. 7, 2013

(51) Int. Cl.
*H04L 12/801* (2013.01)
*H04L 12/823* (2013.01)
*H04W 28/02* (2009.01)

(52) U.S. Cl.
CPC .......... *H04L 47/32* (2013.01); *H04L 47/10* (2013.01); *H04W 28/02* (2013.01); *H04L 47/11* (2013.01); *H04L 47/14* (2013.01); *H04L 47/193* (2013.01)

(58) Field of Classification Search
CPC ......... H04L 47/00; H04L 47/10; H04L 47/19; H04L 47/32; H04L 47/629; H04L 47/225
See application file for complete search history.

(56) References Cited

U.S. PATENT DOCUMENTS 6,643,256 B1 * 11/2003 Shimojo et al. .............. 370/229
6,882,624 B1 * 4/2005 Ma .............................. 370/236.1
(Continued)

FOREIGN PATENT DOCUMENTS

CN 1518283 A 8/2004
EP 1528832 A1 5/2005
(Continued)

OTHER PUBLICATIONS

Foronda, A. et al. "A New Schema Congestion Control to Promote Fairness in the Internet Traffic." Proceedings of the Advanced International Conference on Telecommunications and Web Applications and Services, Feb. 19-25, 2009, pp. 1-6.
(Continued)

*Primary Examiner* — Anh-Vu Ly
*Assistant Examiner* — Hector Reyes Ortiz
(74) *Attorney, Agent, or Firm* — Patent Portfolio Builders, PLLC

(57) ABSTRACT

A method is provided for congestion control in a network node (114; 510; 900) of a communication network. The network node handles a plurality of data connections for conveying data packets travelling between a core side and a terminal side of the communication network. The method is performed in the network node and comprises detecting (210) a condition indicative of a congestion for any of the data connections, selecting (220), among the data connections, a data connection ($RAB_{drop}$) for which a bit-rate reduction is to be caused, and determining (230) a number ($X_i$) of data packets to be discarded for the selected data connection. The determined number depends on a time-integrated difference between experienced and targeted bit-rates for the selected data connection. Then, the reduction of the bit-rate is initiated (240) for the selected data connection
(Continued)

by causing discarding of the determined number of data packets.

10 Claims, 8 Drawing Sheets

(56) References Cited

U.S. PATENT DOCUMENTS

| | | | |
|---|---|---|---|
| 6,922,396 B1 | 7/2005 | Knappe | |
| 7,424,546 B1* | 9/2008 | Aweya et al. | 370/235 |
| 8,194,545 B2* | 6/2012 | Monzawa | 370/232 |
| 8,213,453 B1* | 7/2012 | Voruganti et al. | 370/444 |
| 2001/0036157 A1* | 11/2001 | Blanc et al. | 370/235 |
| 2004/0148423 A1* | 7/2004 | Key | H04L 47/10 |
| | | | 709/235 |
| 2004/0160922 A1 | 8/2004 | Nanda et al. | |
| 2004/0179473 A1* | 9/2004 | Thibodeau et al. | 370/229 |
| 2005/0180327 A1* | 8/2005 | Banerjee | H04L 47/10 |
| | | | 370/236 |
| 2006/0159016 A1* | 7/2006 | Sagfors et al. | 370/230 |
| 2007/0070907 A1 | 3/2007 | Kumar et al. | |
| 2007/0239889 A1* | 10/2007 | Mochida et al. | 709/237 |
| 2008/0170500 A1* | 7/2008 | Ito | H04L 1/0018 |
| | | | 370/235 |
| 2009/0116390 A1* | 5/2009 | Madan et al. | 370/235 |
| 2010/0039937 A1* | 2/2010 | Ramanujan | H04L 47/10 |
| | | | 370/232 |
| 2010/0091785 A1 | 4/2010 | Monzawa | |
| 2011/0235528 A1* | 9/2011 | Racz et al. | 370/244 |
| 2012/0188894 A1 | 7/2012 | Huschke et al. | 370/252 |
| 2013/0010598 A1* | 1/2013 | Ludwig et al. | 370/235 |

FOREIGN PATENT DOCUMENTS

| | | |
|---|---|---|
| WO | 9904536 A2 | 1/1999 |
| WO | 2006037378 A1 | 4/2006 |
| WO | 2010107348 A1 | 9/2010 |

OTHER PUBLICATIONS

Lakkakorpi, J. et al. "Comparison of Different Active Queue Management Mechanisms for 3G Radio Network Controllers." IEEE Wireless Communications and Networking Conference, Apr. 3-6, 2006, pp. 80-85, Las Vegas, NV, USA.

Office Action in CN application No. 201180064841.3 mailed Dec. 23, 2015, English Translation Submitted, 20 pages.

* cited by examiner

ADAPTIVE RELATIVE BITRATE MANAGER FOR TCP DEPENDING FLOW CONTROL

TECHNICAL FIELD

The present invention relates to network congestion control, and more particularly to a method for congestion control in a network node of a communication network, said network node being adapted to handle a plurality of data connections for conveying data packets travelling between a core side and a terminal side of said communication network. The invention also relates to a network node, computer program product and computer readable medium adapted to perform the method.

BACKGROUND

Network congestion can basically appear in any part of a complex communication network where potential bottlenecks may occur as a result of insufficient network throughput capacity in relation to the (momentary) communication traffic load. One common example, which will be adhered to in this document, is the transport network in a mobile telecommunications system.

In recent years, the functionality offered by mobile telecommunications systems has been expanded from pure (circuit-switched) voice communication to a variety of services in addition to voice calls. Many of these additional services employ packet-switched data communication between a server and a mobile terminal, or between two mobile terminals, over the mobile telecommunications network and associated wide area networks such as the Internet. For instance, the 3G/UMTS (3rd Generation/Universal Mobile Telecommunications System) architecture involves packet-based communication in accordance with the High Speed Packet Access (HSPA) protocol set, including High Speed Downlink Packet Access (HSDPA) for downlink communication and High Speed Uplink Packet Access (HSUPA), also known as Enhanced Uplink (EUL), for uplink communication. These protocols are defined in the 3rd Generation Partnership Project (3GPP) specifications.

In any packet-switched communication system, problems like packet losses or congestion between competing data flows can occur at various locations in the system. Data flow control is therefore provided at several levels in the protocol architecture. For instance, in the 3G/UMTS (3rd Generation/Universal Mobile Telecommunications System) architecture, the Transmission Control Protocol (TCP) may be applied on an upper level between a TCP server and an end-user application in a mobile terminal (user equipment, UE). Radio Link Control (RLC) is applied between a Serving Radio Network Controller (SRNC) and a UE, whereas HSPA Flow Control (FC) is applied to HSPA traffic flows over the Transport Network (TN; Iub) between an SRNC and a Radio Base Station (RBS; Node B).

Efficient congestion control is complicated by the fact that the different protocols involved terminate at different locations in the network. This problem situation has been addressed in WO 2010/107348, which takes the position that TCP cannot efficiently resolve a congestion situation in the radio access network (which includes the transport network), because lower layer retransmissions hide the congestion situations from TCP. Instead, WO 2010/107348 introduces an improved HSPA Flow Control (FC) which is performed by a radio base station and which in particular seeks to obtain proportional fair bandwidth sharing among contending traffic flows over the transport network. For this purpose, a relative bit-rate (RBR) value is assigned to each traffic flow, which will cause the HSPA Flow Control to favor traffic flows having a higher RBR value over those having a lower RBR value. The RBR concept allows Quality of Service (QoS) bit-rate differentiation between different types of end-user subscriptions.

A network node in the form of a radio base station will typically handle a plurality of data connections over the transport network, where each data connection (often referred to as Radio Access Bearer, RAB) is adapted to convey data packets travelling between the core side and terminal side of the communication network. Each data connection may handle a varying number of ongoing TCP sessions between one or more TCP servers and a TCP client running in a mobile terminal for a certain end-user. This complicates the congestion control to be performed by the radio base station in the transport network, and the problem is accentuated if the congestion control is to support QoS bit-rate differentiation between different types of end-user subscriptions among the data connections (RAB:s) handled by the radio base station in question.

SUMMARY

It is accordingly an object of the invention to eliminate or alleviate at least some of the problems referred to above.

The present inventors have realized that congestion control can be performed in another way than the one employed in for instance the aforementioned WO 2010/107348. The present inventors envisage congestion control by triggering inherent congestion avoidance mechanism of an upper-level packet-switched protocol, which may be for instance TCP. The congestion control envisaged by the present inventors is particularly suitable for providing enhanced QoS bit-rate differentiation among the data connections (RAB:s) handled by a network node.

One aspect of the present invention therefore is a method for congestion control in a network node of a communication network, said network node being adapted to handle a plurality of data connections for conveying data packets travelling between a core side and a terminal side of said communication network. The method comprises, in said network node:

detecting a condition indicative of a congestion for any of said plurality of data connections;

selecting, among said plurality of data connections, a data connection for which a bit-rate reduction is to be caused;

determining a number of data packets to be discarded for the selected data connection, wherein the determined number depends on a time-integrated difference between experienced and targeted bit-rates for the selected data connection; and initiating the reduction of the bit-rate for the selected data connection by causing discarding of said determined number of data packets.

In one or more embodiments, detecting a condition indicative of a congestion for any of said plurality of data connections involves:

monitoring sequence numbers associated with incoming data packets, wherein said condition is triggered when the monitored sequence numbers indicate that data has been lost or received out of order.

In one or more embodiments, the data connection for which a bit-rate reduction is to be caused is selected as the data connection for which the congestion-indicative condition has been detected.

Alternatively, in one or more embodiments, the data connections are associated with respective weights, w, for Quality-of-Service bit-rate differentiation, and wherein selecting the data connection for which a bit-rate reduction is to be caused involves:

maintaining an average bit-rate value, $R_k$, for each individual data connection; and selecting the data connection k for which a bit-rate reduction is to be caused as the data connection among said data connections which yields the highest value of $R_k/w_k$.

This or these embodiments may further involve:

for each individual data connection, maintaining an individual number of data packets to be discarded in case the individual data connection is selected as said selected data connection, wherein the individual number of data packets to be discarded is calculated based on an output from an integrating controller which as control error accepts a difference between experienced bit-rate and targeted bit-rate;

wherein the experienced bit-rate is the average bit-rate value for said individual data connection;

wherein the targeted bit-rate is calculated as the sum of the average bit-rate values, for all of the data connections divided by the sum of the weights for all of the data connections, multiplied by the weight of the individual data connection.

As a further refinement, the integrating controller may also have a term which is proportional to the control error and provides a direct response to changes in the control error.

In one or more embodiments, the network node is adapted for conveying said data packets in compliance with an acknowledgement-based data transmission protocol for delivering a data stream from a sending host to a receiving host, wherein initiating the reduction of the bit-rate for the selected data connection involves:

manipulating each of said determined number of data packets in a way such that the receiving host upon receipt of the data packets will respond to the sending host with an indication that the data packets have not been duly received.

The acknowledgement-based data transmission protocol may the Transmission Control Protocol, TCP, wherein said sending host is a TCP server, said receiving host is a TCP client; and manipulating each of said determined number of data packets involves causing the TCP client to respond to the TCP server with multiple acknowledgements of one or more data packets received prior to said determined number of data packets.

In one or more embodiments, the communication network is a transport network for a radio communication system, the network node is a radio base station, the plurality of data connections are radio access bearers, and the data packets are conveyed in the payload of protocol data units in HS-DSCH data frames.

A second aspect of the invention is a computer program product comprising computer program code means for executing the method according to the first aspect when said computer program code means are run by a programmable controller of the network node.

A third aspect of the invention is a computer readable medium having stored thereon a computer program comprising computer program code means for executing the method according to the first aspect when said computer program code means are run by a programmable controller of the network node.

A fourth aspect of the invention is a network node of a communication network, said network node being adapted to handle a plurality of data connections for conveying data packets travelling between a core side and a terminal side of said communication network, and said network node comprising a controller, wherein said controller is configured to:

detect a condition indicative of a congestion for any of said plurality of data connections;

select, among said plurality of data connections, a data connection for which a bit-rate reduction is to be caused;

determine a number of data packets to be discarded for the selected data connection, wherein the determined number depends on a time-integrated difference between experienced and targeted bit-rates for the selected data connection; and initiate the reduction of the bit-rate for the selected data connection by causing discarding of said determined number of data packets.

The network node may be further configured to perform the steps of the method as defined above for the first aspect.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Objects, features and advantages of embodiments of the invention will appear from the following detailed description, reference being made to the accompanying drawings.

DETAILED DESCRIPTION

Figure 1:
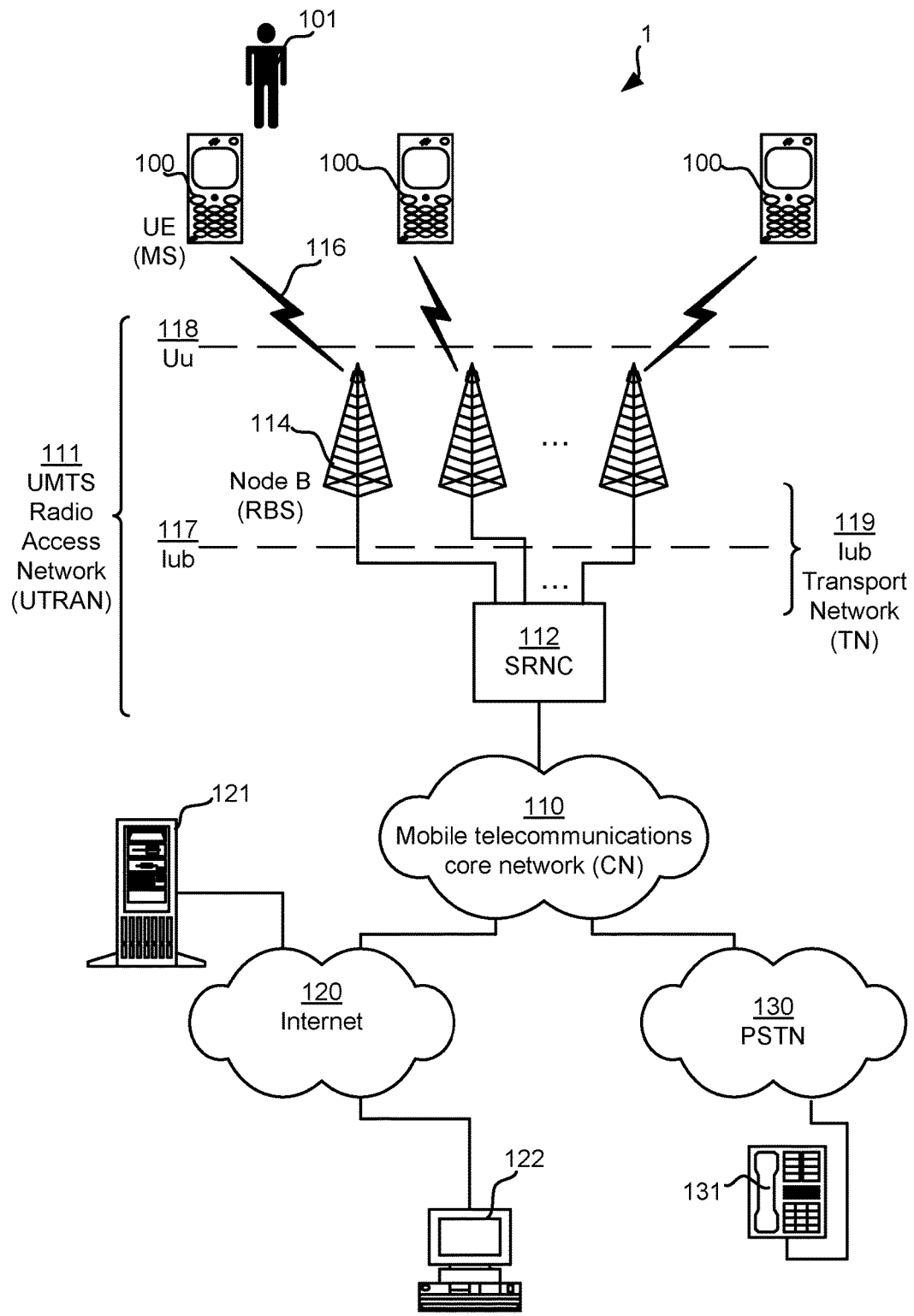
FIG. 1 is a schematic illustration of a non-limiting example of a telecommunication system in which embodiments of the present invention may be exercised.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Before turning to a detailed description of the disclosed embodiments, an exemplifying environment in which they may be exercised will now be briefly described with reference to FIG. 1.

FIG. 1 illustrates a cellular telecommunications system 1 according to the familiar 3G/UMTS system architecture, as defined in the 3GPP specifications. Users 101 of user equipment (UE) 100 (i.e. mobile terminals) may use different telecommunications services, such as voice calls, Internet browsing, video calls, data calls, facsimile transmissions, still image transmissions, video transmissions, electronic messaging, and e-commerce. An individual UE 100 connects to a mobile telecommunications core network 110 over a radio link 116 to a radio base station (RBS) 114 (also known as Node B), which in turn is connected to a serving radio network controller (SRNC) 112. A transport network (TN) 119, also known as Iub 117, is provided between the SRNC 112 and RBS 114, and an air interface 118, also known as Uu, is provided between RBS 114 and UE 100. SRNC 112, TN 119 and RBS 114 thus constitute a UMTS Radio Access Network (UTRAN) 111.

It is to be noticed that the situation in FIG. 1 has been kept on a general level in order not to obscure the disclosure in unnecessary detail. As is well known to the skilled person, there are other elements in a real 3G/UMTS system, not shown in FIG. 1. For instance, in some situations where a connected individual UE 100 is handed over to another cell, a Drift Radio Network Controller (DRNC) may act as a switch to route information between the SRNC and the UE.

A conventional public switched telephone network (PSTN) 130 may be connected to the mobile telecommunications core network 110. Various telephone terminals, including a stationary telephone 131, may connect to the PSTN 130. The mobile telecommunications core network 110 is also typically associated with a wide area data network 120, such as the Internet. Server computers 121 and client computers 122 may be connected to the wide area data network 120 and therefore allow communication of packet data with the UE 100. Such packet-based communication may for instance be in accordance with the HSPA protocol set, including HSDPA for downlink communication and EUL (i.e. HSUPA) for uplink communication. For details about these protocols, reference is made to the 3GPP specifications, which may be found for instance at http://www.3gpp.com/.

A common situation in the telecommunications system 1 will be the transfer of data from a sender, such as one of the server computers 121, to a receiver, such as one of the UE:s 100. Such data transfer may typically occur in accordance with the TCP protocol. Thus, as seen in FIG. 5, a TCP server application 500 will set up a TCP session with a TCP client application 520 which runs in the UE 100. The data to be transferred may be divided into data packets, such as IP packets, by the TCP server application 500 and then sent in TCP segments to the TCP client application 520. Of course, the mobile telecommunications core network 110 and the radio access network 111, including the transport network 119, will be involved in this transfer of data packets. In addition to TCP, many other protocols will be involved during the conveyance of the data packets, as is readily understood by the skilled person. For instance, the protocol situation from the point of view of a radio base station 510 in the transport network is shown in a simplified manner in FIG. 4.

Figure 4:
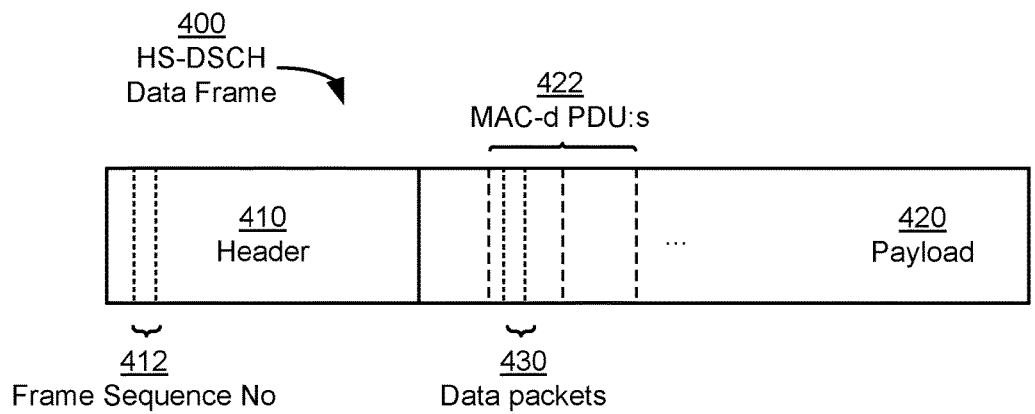
FIG. 4 schematically illustrates a HS-DSCH data frame.
Figure 5:
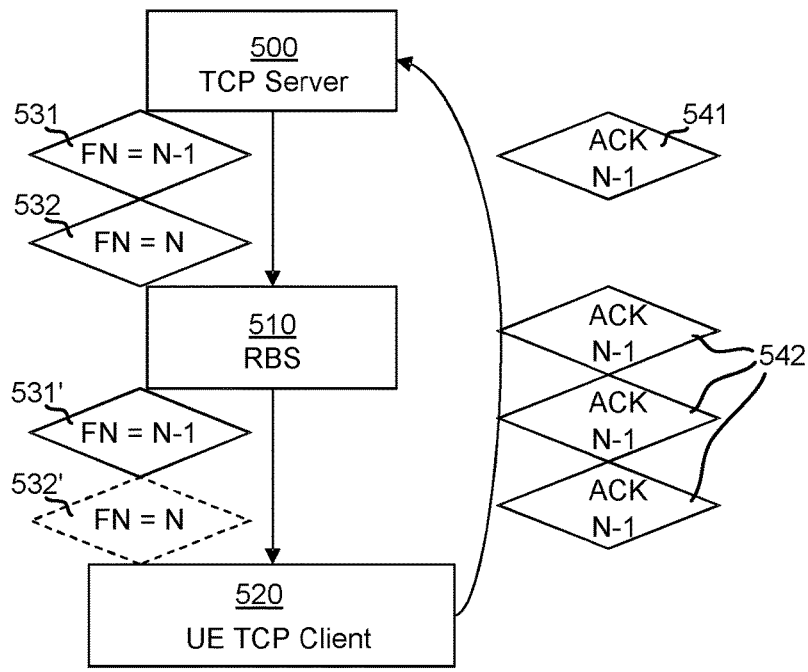
FIG. 5 schematically illustrates an approach to do congestion control by triggering an inherent congestion avoidance mechanism of an upper-level TCP protocol by way of deliberately causing a data packet to be discarded.

As seen in FIG. 4, the data packets 430 that originated from the TCP server application 500 will be handled in the radio base station 510 in the form of HS-DSCH data frames 400. Each HS-DSCH data frame 400 comprises a header 410 and a payload 420. The header includes a frame sequence number 412 and also specifies the contents of the payload 420. The payload 420 will contain a number of MAC-d portable data units (PDU) 422, in which the data packets 430 are encapsulated.

As is well known, the TCP protocol is an acknowledgement-based data transmission protocol where the TCP server application 500 will expect an acknowledgement from the TCP client application 520 for a certain TCP segment. In FIG. 5, the TCP client application 520 issues at 541 an acknowledgement "ACK N–1" in response to successful receipt of a TCP segment "FN=N–1" having a certain frame number or sequence number N–1 (see 531). If such an acknowledgment is not issued, the TCP server application 500 will act to retransmit the TCP segment in question.

The TCP acknowledgement scheme also serves a role in congestion control or congestion avoidance. For instance, in case the TCP server application 500 receives repeated acknowledgements "ACK N–1" (see 542) for the previous TCP segment "FN=N–1" but not for the most recently sent TCP segment "FN=N" (see 532), the congestion control/congestion avoidance functionality in the TCP server application 500 will infer this as a congestion condition somewhere on the network and, in response, reduce the bit-rate for the forthcoming transmission by a certain rate, such as for instance a 50% bit-rate reduction.

In some embodiments of the invention, the radio base station 510 will use this inherent property of the TCP protocol for performing congestion control in the radio base station 510, even though the TCP protocol is not terminated therein. Continuing with the example shown in FIG. 5, the radio base station 510 will handle the previous TCP segment "FN=N–1" in the normal manner by forwarding the MAC-d PDU 422 that contains the TCP segment "FN=N–1" and its data packets 430 over the air interface to the TCP client application 520. This will, as described above, cause the TCP client application 520 to issue the acknowledge "ACK N–1", as seen at 541.

However, when the radio base station 510 detects a condition in the transport network which indicates a congestion, it may signal this to the TCP server application 500 by deliberately modifying the contents of the MAC-d PDU 422 in a way such that the TCP client application 520 will interpret the received TCP segment "FN=N" as lost or destroyed and therefore discard it. As a result of having discarded the received TCP segment "FN=N", the TCP client application 520 will issue an acknowledgement "ACK N–1" for the previous TCP segment "FN=N–1", once a subsequent TCP segment is correctly received. When three such subsequent TCP segments "FN=N+1", "FN=N+2" and "FN=N+3" (not shown in FIG. 5) have been correctly received and caused the TCP client application 520 to respond three times with an acknowledgement "ACK N–1" for the previous TCP segment "FN=N–1", the congestion control/-congestion avoidance functionality in the TCP server application 500 will act upon such multiple consecutive acknowledgements "ACK N–1" by reducing the bit-rate for the forthcoming transmissions in the TCP session.

Therefore, by causing the TCP segment "FN=N" to be discarded in this way, the radio base station 510 will in effect be capable of performing congestion control by initiating a bit-rate reduction for the TCP session, even though the actual bit-rate reduction is not executed by the radio base station 510.

Figure 9:
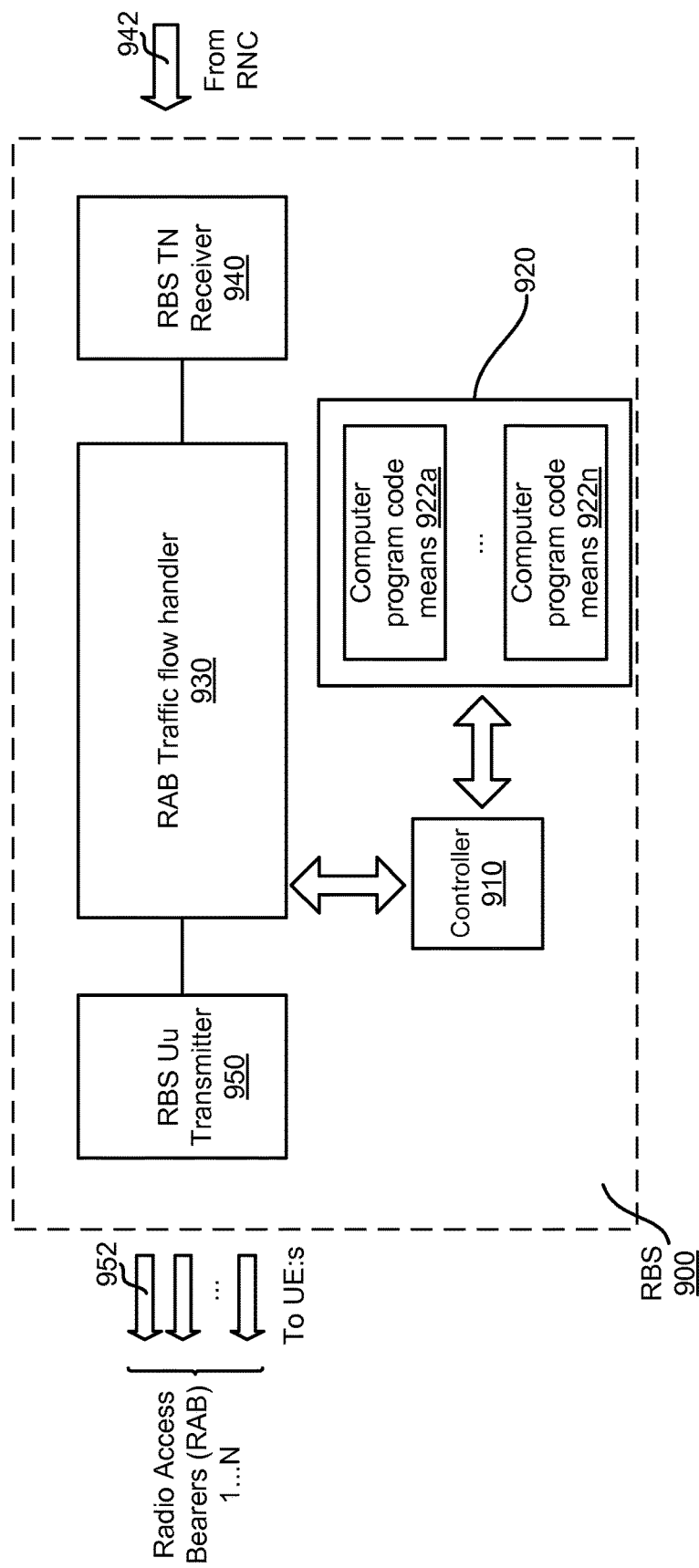
FIG. 9 illustrates some key elements of a network node in the form of a radio base station in which embodiments of the present invention may be implemented.

The situation above has been kept on a simple level, involving just a single TCP session. However, in reality, a radio base station 114 in a transport network 119 will be responsible for handling a large number of concurrent TCP sessions between various TCP servers and TCP clients in different UE:s 100. Reference is now made to FIG. 9 which illustrates some key elements of a radio base station 900 (e.g. 114 in FIG. 1) for handling downlink packet data 942 as received from a radio network controller (e.g. SRNC 112 in FIG. 1). An RBS transport network (TN) receiver 940 acts to receive the downlink packet data 942 from the radio network controller. A radio access bearer (RAB) traffic flow handler 930 will take care of the received data 942 and handle it appropriately so that it can be transmitted further on towards the respective UE.s 100 via an RBS Uu transmitter 950 over a plurality of data connections or RAB:s 952 on the air interface Uu (cf 118 in FIG. 1). Each data connection or RAB 952 may contain one or a plurality of TCP sessions destined to a particular UE 100, and the number of TCP sessions carried by each such data connection or RAB 952 will vary from time to time.

The radio base station 900 also has a programmable controller 910 and associated memory or data storage 920. The controller 910 may be implemented by at least one central processing unit (CPU), digital signal processor (DSP) or other programmable electronic logic device such as an application-specific integrated circuit (ASIC) or field-programmable gate array (FPGA), or any combination thereof. The memory 920 may contain work memory and storage memory, and may for instance be implemented in the form of RAM, EEPROM, flash memory (e.g. memory card), magnetic hard disk, or any combination thereof. The memory 920 is capable of storing program code means 922a-922n which is executable by the controller 910. Therefore, all or some of the functionality of the RAB traffic flow handler 930 may be performed by the controller 910 being suitably programmed in the form of the program code means 922a-922n.

Figure 3:
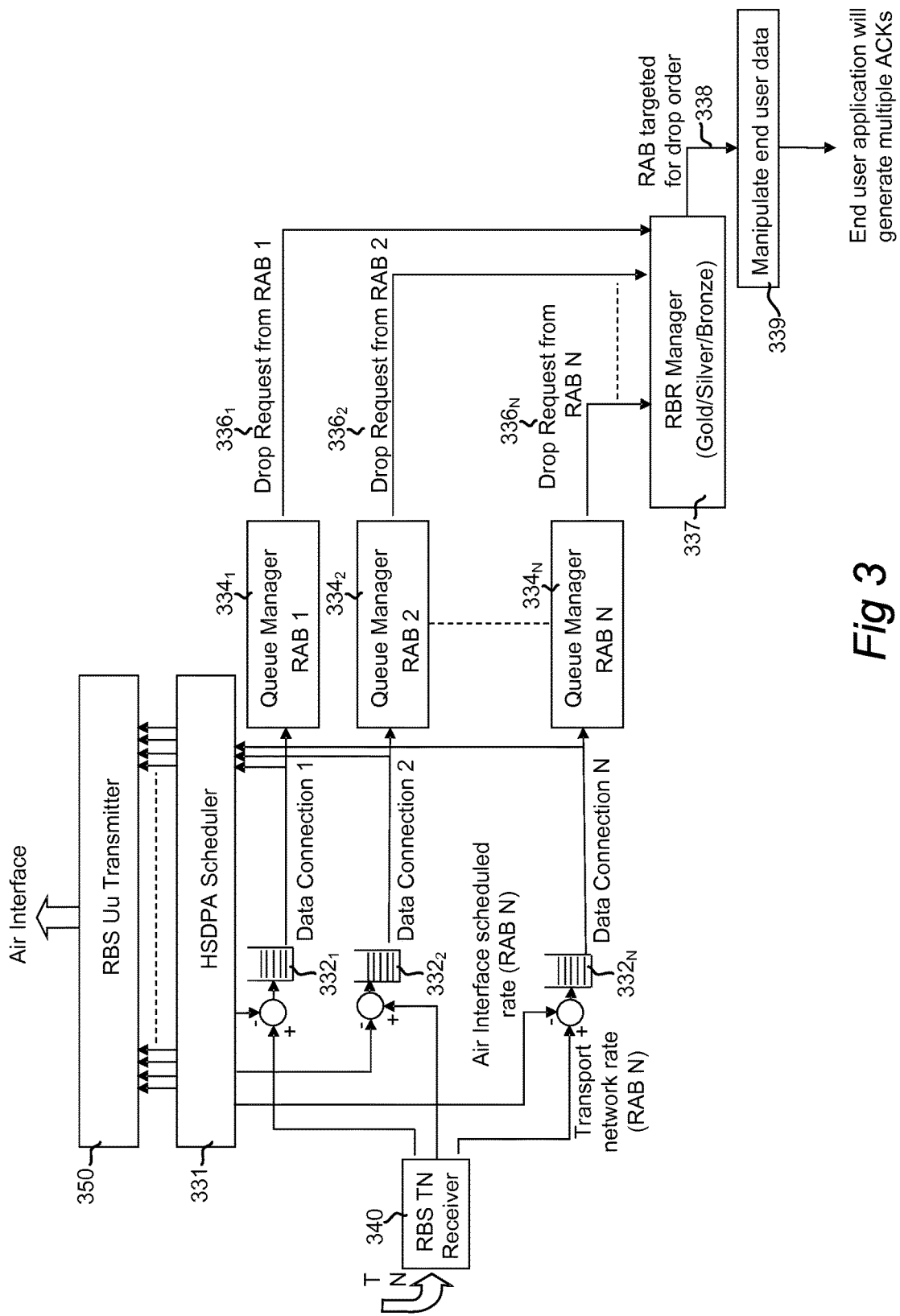
FIG. 3 is a schematic block diagram of HSDPA queue manager functionality in a radio base station in which embodiments of the present invention may be implemented.

An important task for the RAB traffic flow handler 930 is the scheduling of outgoing data traffic. As seen in FIG. 3, HSDPA queue manager functionality is included in the RAB traffic flow handler 930. An HSDPA scheduler 331 is assisted by a plurality of queue managers $334_1$-$334_N$, managing respective queues $332_1$-$332_N$. Each queue contains data destined for a respective one of the data connections 952 (RAB 1-RAB N) in the form of MAC-d PDU:s 422 (see FIG. 4) which have been conveyed to the radio base station 900 at 942 in incoming HS-DSCH data frames 400 (FIG. 4) from the core side of the network 1 (i.e. the SRNC 112).

Another important task for the RAB traffic flow handler 930 is congestion control. For the disclosure of the present embodiment, congestion control refers to a transport network-limited scenario rather than an air interface-limited scenario. To this end, each queue manager $334_i$ is configured to detect when transport network congestion has occurred for its data connection. The functionality performed by the RAB traffic flow handler 930 to provide congestion control in accordance with the inventive concept will now first be described on a general level with reference to FIG. 2a. Then, various particulars and aspects of the congestion control will be described in more detail with reference to the other drawings.

Figure 2A:
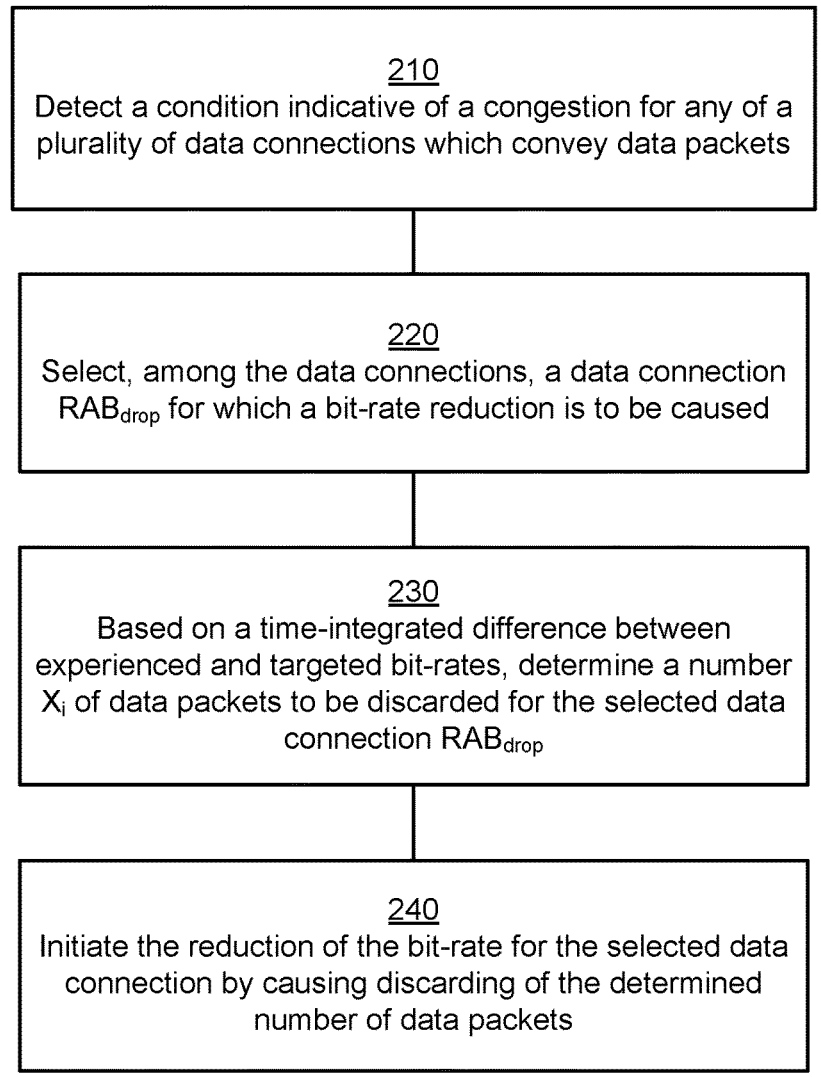
FIG. 2a is a schematic flowchart diagram to illustrate the inventive concept.

In step 210 of FIG. 2a, the RAB traffic flow handler 930 detects a condition which is indicative of a congestion for any of the data connections 952. In response, in step 220 the RAB traffic flow handler 930 selects, among the data connections 952, a data connection $RAB_{drop}$ for which a bit-rate reduction is to be caused. In step 230, the RAB traffic flow handler 930 determines a number $X_i$ of data packets to be discarded for the selected data connection $RAB_{drop}$. The determined number $X_i$ depends on a time-integrated difference between experienced and targeted bit-rates for the selected data connection $RAB_{drop}$. Finally, the RAB traffic flow handler 930 initiates in step 240 the reduction of the bit-rate for the selected data connection $RAB_{drop}$ by causing discarding of the determined number of data packets.

The implementation of the different steps of the congestion control shown in FIG. 2a will now be described in more detail for some embodiments of the invention. Starting with step 210, each queue manager $334_1$-$334_N$ is responsible for detecting a condition which is indicative of a congestion for its data connection 952 (i.e., RAB i for queue manager $334_i$, where i=1 ... N). This may involve monitoring the sequence numbers 412 of the received incoming HS-DSCH data frames 400 from the core side of the network 1 (i.e. the SRNC 112), wherein the congestion-indicative condition is triggered when the monitored sequence numbers indicate that data has been lost or received out of order. Alternatively, congestion may be detected in other ways. One way is to examine the contents of the MAC-d PDU:s 422 to determine that the data packets 430 contained therein have been corrupted. Another way is to detect that a target buffer length or dwell time for the queue $332_i$ has been exceeded. Still another way is to detect a processing delay or memory overflow.

When an individual queue manager $334_i$ has detected congestion in step 210, it will indicate this by issuing a drop request $336_i$ (as seen in FIG. 3). In one embodiment, the data connection 952 (RAB i) for which the drop request $336_i$ was issued is also selected in step 220 as the data connection $RAB_{drop}$ for which a bit-rate reduction is to be caused. In other, more advanced embodiments, the selection in step 220 takes due account of the relative bit-rates (RBR:s) of the data connections 952. Before explaining this in detail, an introduction to the RBR approach will be given with reference to FIG. 2b.

Figure 2B:
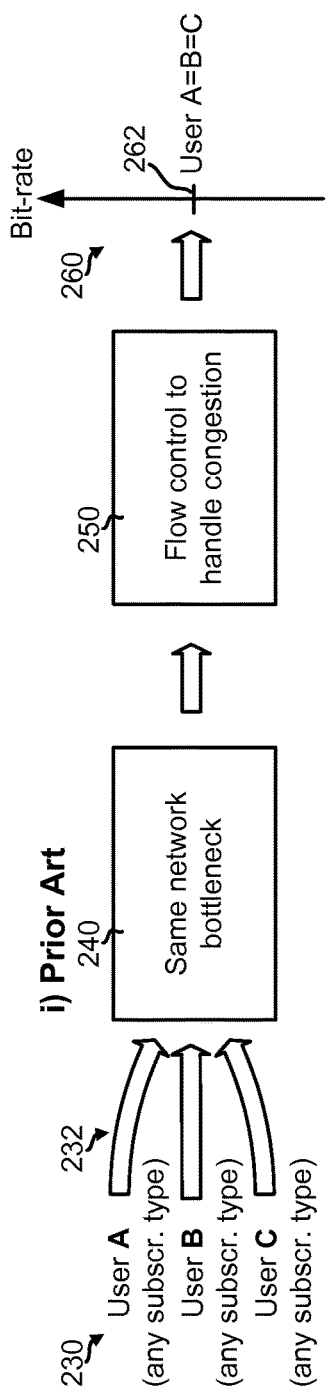
FIG. 2b illustrates congestion control with QoS bit-rate differentiation to obtain proportional fair sharing, for which embodiments of the invention are particularly useful.
Figure 2B:
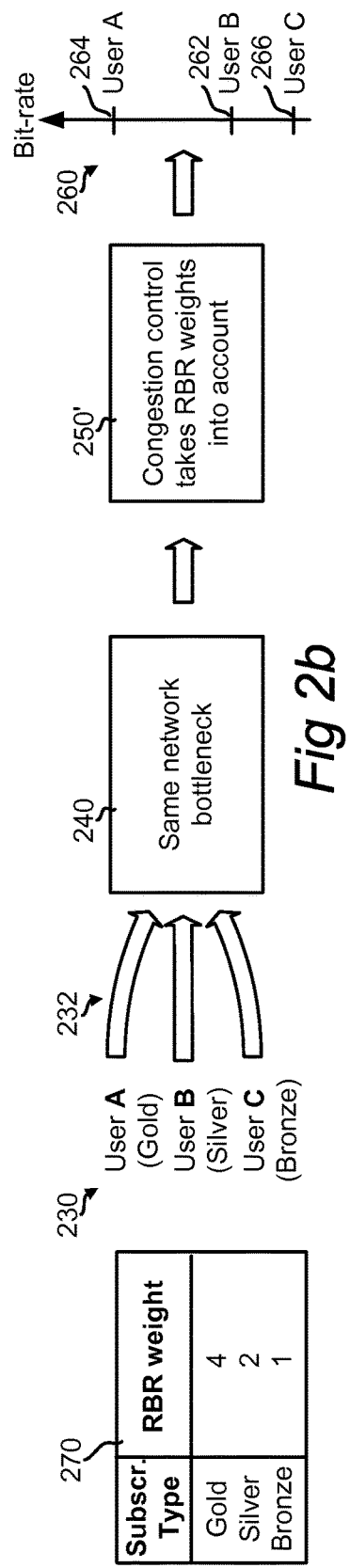

As seen in FIG. 2b, introducing the notion of relative bit-rate provides a kind of Quality of Service profiling, where prioritized users may be favored over less prioritized users when it comes to sharing the available bandwidth when contending traffic flows (data connections 952/RAB 1-N) of the users share the same transport network bottleneck. The relative bit-rate, RBR, concept is used to obtain proportional fair bandwidth sharing among contending traffic flows subjected to the same transport network bottleneck. The effect of the RBR concept is illustrated at ii) in FIG. 2b, whereas the corresponding (traditional) situation when the RBR concept is not applied is illustrated at i) in FIG. 2b.

Starting with i) at 230 in FIG. 2b, a number of users A, B, C receive traffic flows 232 which are subjected to the same transport network bottleneck 240. In other words, the contending traffic flows 232 have the same TN QoS differentiation class and traverse the same path in the transport network 119. Conventional HSPA flow control 250 will treat all contending traffic flows 232 equally (albeit individually), by subjecting each flow to additive increase operations with the same amount of bit-rate increase as for the other flows, until congestions occurs, wherein multiplicative decrease operations instead are performed as appropriate. As a result of the HSPA flow control 250, for the given TN bottleneck 240, all users A, B, C will—after some iterations of the flow control—arrive at about the same bit-rate 262, as seen at 260—i.e. a fair bandwidth sharing. This will happen even though the users A, B, C may have different priorities in the mind of the network operator, such as subscriptions with different levels of importance (e.g. differentiated by different subscription fees), since the traffic flows 232 are communicated within the same TN QoS differentiation class.

By introducing the concept of RBR, as seen at ii) in FIG. 2b, proportional fair bandwidth sharing may instead be provided for the traffic flows 232 of the users A, B, C. Here, it is assumed that the user A has a subscription of type Gold, which is more prioritized than the subscription type Silver of user B, which in turn is more prioritized than the subscription type Bronze of user C. Each subscription type is assigned a respective RBR weight, as seen at 270. Therefore, when congestion occurs for the traffic flows 232 of users A-C because of the common TN bottleneck 240, the traffic flow for user A will have a higher RBR weight (e.g. 4), than the traffic flow for user B (e.g. 2), whereas the traffic flow for user C will have a lower RBR weight (e.g. nominal, 1). The congestion control 250' is adapted to take the respective RBR weight of each traffic flow into account, such that traffic flows with a higher RBR weight (e.g. the flow of user A) will be favored over those with a lower RBR value (e.g. the flow of user B or C).

As a result, proportional-fair bandwidth sharing among the contending traffic flows will be obtained. This means that each flow will get a bit-rate which differs relative to the nominal bit-rate (i.e. the bit-rate that would have been obtained by the traditional fair bandwidth sharing scheme) to an extent which corresponds to the relative difference in RBR. In other words, the bit-rate 264 given to user A compared to the bit-rate 262 offered to user B will approach a difference of a factor 4/2=2, reflecting the difference in RBR between subscription types Gold and Silver. Correspondingly, the nominal bit-rate 266 given to user C compared to the bit-rate 262 offered to user B will approach a difference of a factor 1/2=0.5 corresponding to the difference in RBR between subscription types Bronze and Silver. The difference between users A and C will be a factor 4/1=4.

Reference is now made again to the selecting step 220 of FIG. 2a. In an embodiment which uses the RBR concept, the selecting step 220 takes due account of the relative bit-rates (RBR weights) of the data connections 952. To this end, an RBR manager 337 is provided, as seen in FIG. 3. The RBR manager 337 receives a drop request $336_i$ from any queue manager $334_i$ once it has detected congestion in step 210. The RBR manager 337 then determines which data connection $RAB_{drop}$ to cause a bit-rate reduction for in the following way. An average bit-rate value, $R_k$, for each individual data connection 952 (RAB k, k=1-N) is maintained. The data connection $RAB_{drop}$ for which a bit-rate reduction is to be caused is then selected as the data connection which yields the highest value of $R_k/w_k$, where $w_k$ is the RBR weight associated with data connection RAB k.

As previously mentioned, step 230 of FIG. 2a then determines the number $X_i$ of data packets to be discarded for the selected data connection $RAB_{drop}$. In the advantageous embodiments shown in FIGS. 6-8, the number $X_i$ of data packets to be discarded is determined by providing, for each data connection RAB 1-N, an integrating controller I (FIGS. 6 and 7) which operates on the difference between experienced and targeted bit-rates for the data connection in question. An output of the integrating controller I then yields the number $X_i$ of data packets to be discarded if and when that data connection RAB i is selected in step 220.

Figure 6:
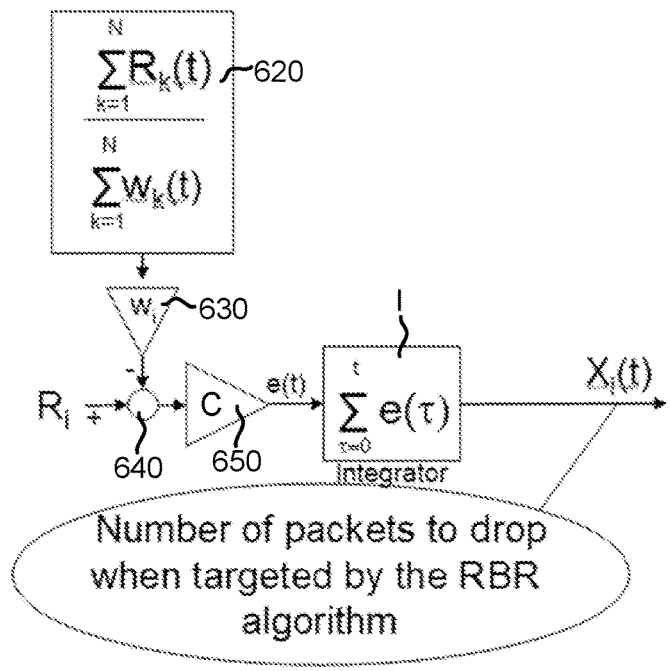
FIG. 6 illustrates an arrangement to do congestion control by including integrating controller functionality according to one embodiment of the invention.
Figure 7:
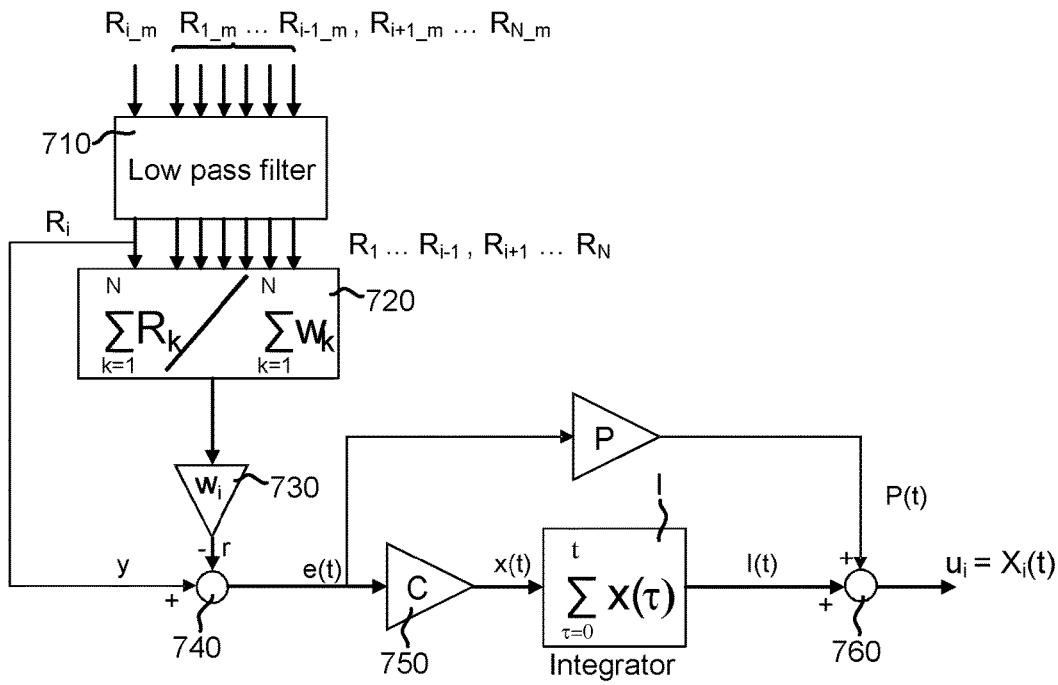
FIG. 7 illustrates an arrangement to do congestion control by including proportional and integrating controller functionality according to another embodiment of the invention.

FIGS. 6 and 7 illustrates two different embodiments of the integrating controller I and the environment in which it operates, including input and output parameters. As control error e(t), the integrating controller I accepts a difference between experienced bit-rate and targeted bit-rate. The experienced bit-rate is the average bit-rate value, for the individual data connection RAB i. The targeted bit-rate is calculated as the sum of the average bit-rate values $R_k$ for all of the data connections RAB k, k=1-N, divided by the sum of the RBR weights $w_k$ for all of the data connections, multiplied by the weight $w_i$ of the individual data connection. This is seen at 620 and 630 in FIG. 6, and at 720 and 730 in FIG. 7. The average bit-rate values $R_k$ are obtained by feeding the momentary bit-rates $R_{k\_m}$ through a low pass filter 710, as seen in FIG. 7. The difference between experienced bit-rate and targeted bit-rate is calculated at 640/740 and is multiplied at 650/750 with a factor C before being fed to the integrating controller I.

C is a parameter setting which influences the dynamic behavior of the congestion control. The exact value of C is a trade-off between rapid convergence to changes in the surroundings (e.g. changes in the number of ongoing TCP sessions (such as the opening of a new TCP session or the closing of an existing one), or a changed behavior of an ongoing TCP session, or changes in parameters like round-trip time, etc) on the one hand (high value of C), and good static estimation accuracy on the other hand (low value of C). It is well within the realm of the skilled person to determine an appropriate value of C when taking an actual implementation in consideration.

The integrating controller I thus estimates the number $X_i(t)$ of packets to drop for RAB i at time instant t. This can be mathematically expressed as $$X_i(t) = \max\left\{1, X_i(t-1) + C\left(R_i(t) - W_i(t)\frac{\sum_{k=1}^{N} R_k(t)}{\sum_{k=1}^{N} W_k(t)}\right) - S\right\},$$

where S is a small value, such as 0.01. A trailing subtraction with S is done to make $X_i(t)$ to drift towards 1 when the difference between experienced bit-rate and targeted bit-rate is small. A max function is used to limit the number of packets to drop to above 1.

The embodiment shown in FIG. 7 differs from the one shown in FIG. 6 in that it comprises, in addition to the integrating term I, a term P which is proportional to the control error e(t) and provides a direct response to changes in the control error. The results from the integrating and proportional terms I and P are added at 760 to yield the output value $X_i(t)$. Having a proportional term P will act to speed up the convergence. Therefore, a lower value of C may be used.

Figure 8:
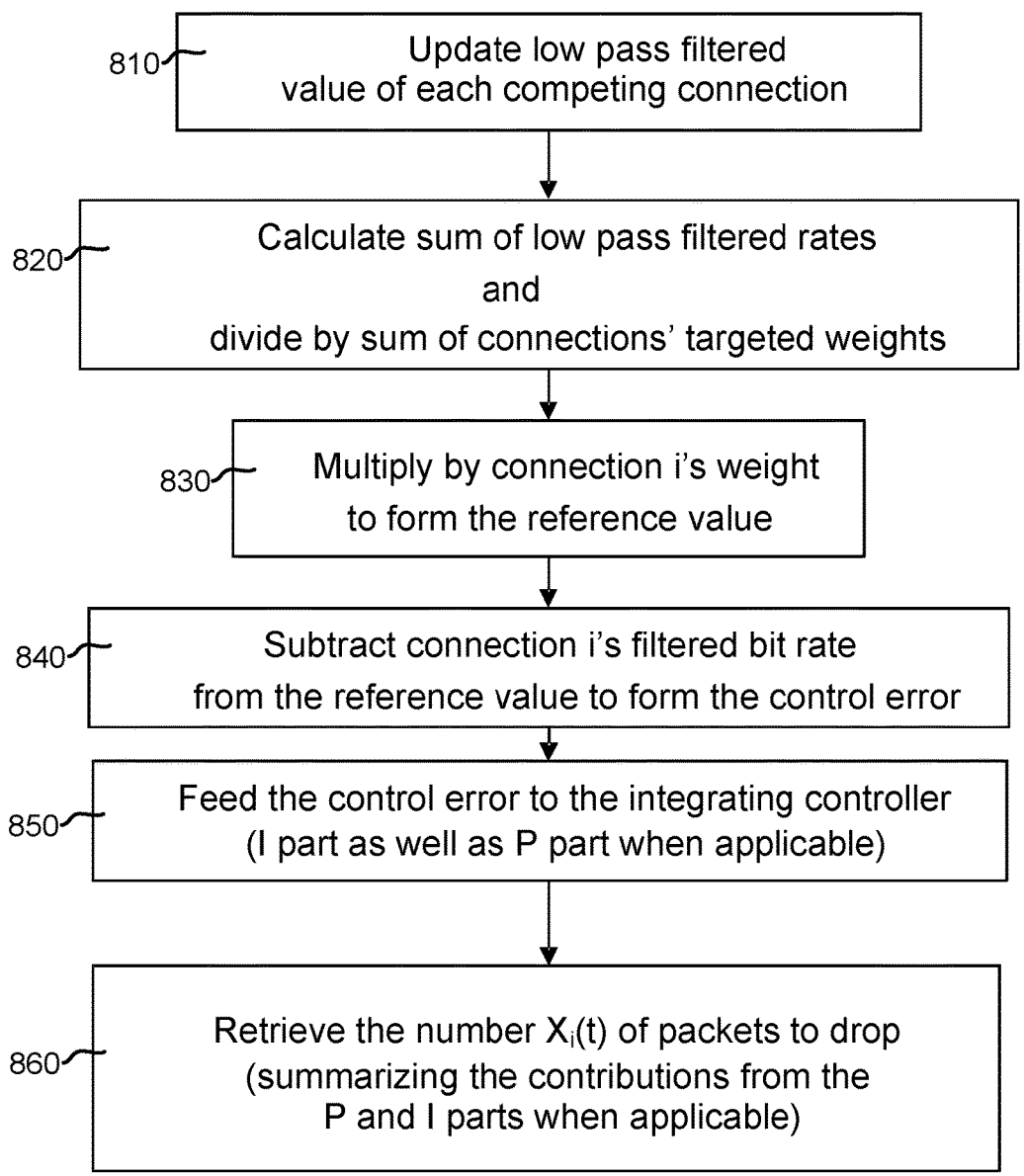
FIG. 8 is a schematic flowchart diagram to illustrate the operational steps performed by the arrangements of FIGS. 6 and 7.

FIG. 8 shows a schematic flowchart diagram which summarizes the operational steps 810-860 which are performed by the elements of FIGS. 6 and 7 in order to calculate the number $X_i(t)$ of packets to drop for data connection (RAB) i at time t.

The basic concept of the disclosed embodiments is therefore to, for each data connection or RAB, look at the difference between past experienced and targeted relative bit rate. The differences over time are summarized and scaled with a fixed tuning parameter to yield the number of packets that needs to be dropped for the particular RAB in order to obtain the targeted relative bit rate. This also lays the basis for an augmentation of an RBR algorithm within a TCP depending flow control algorithm. The augmentation may be referred to as an outer loop within the field of automatic control, since it regulates how many packets that an RAB should drop upon being targeted for bit rate reduction by the RBR algorithm. The analogy comes from the fact that the algorithm handles slow dynamics (changes in number of TCP sessions), while the basic RBR algorithm handles fast dynamics (current relative bit rates). However, the analogy is not perfect, since a conventional outer loop within the field of automatic control sets the reference (target) value for the inner loop. In the case of the disclosed embodiments, the outer loop instead manipulates the control signal (number of packets to drop).

Estimating a suitable number of packets to discard in contrast to simply discarding a single packet is advantageous for the following reasons. First, it is important to notice that the RBR algorithm has control over a plurality of RAB:s; see for instance RBR manager 337 and data connections 1 . . . N in FIG. 3. When one of the RAB:s experiences congestion, the RBR manager 337 is informed accordingly by way of a drop request $336_i$ from the respective queue manager $334_j$. It is then up to the RBR algorithm in the RBR manager 337 to decide which RAB should decrease its bit rate. However, since the RBR algorithm operates per RAB, it has no information about the individual TCP sessions running in the RAB. Therefore, the RBR manager is sensitive to the number of TCP sessions running in an RAB. This can be explained by the nature by which TCP reduces the TCP flow bit rates. Essentially, since TCP reduces the TCP flow bit rates by half, the impact on the RAB bit rate depends on how many TCP sessions that run over the RAB. The effective bit-rate reduction caused by a single packet drop will therefore by considerably different if the chosen RAB runs a small number of TCP sessions than if it runs a higher number of TCP sessions. In turn, this means that proportional fair band-width sharing will be difficult to obtain; an RAB with multiple TCP sessions will experience considerably higher RAB bit rates than an RAB with a single TCP session, despite the RBR algorithm targeting equal RAB bit rates.

By dropping several packets and not just one, there is a good chance that some of the dropped packets belong to different TCP sessions and cause bit-rate reductions for at least a subset of the TCP sessions currently run by the RAB. This will improve the situation towards proportional fair band-width sharing.

Second, the number of concurrent TCP sessions run in an RAB will typically vary considerably from time to time. Existing TCP sessions will end, and new TCP sessions will be initiated in a manner which cannot be accounted for by the RBR algorithm as such. Determining the number of packets to drop based on a time-integrated difference between experienced and targeted bit-rates will further improve the situation towards proportional fair band-width sharing.

Reference is now made to the final step 240 of FIG. 2a, in which the bit-rate reduction for the selected RAB is initiated by causing discarding of the number of packets determined in the previous step 230. In the disclosed embodiment, step 240 involves manipulating each of the determined number of data packets in a way such that the receiving host (e.g. TCP client 520 in FIG. 5) upon receipt of the data packets will respond to the sending host (e.g. TCP server 500 in FIG. 5) with an indication that the data packets have not been duly received. As already mentioned, the RBR manager 337 of FIG. 3 will receive a drop request $336_i$ and determine which data connection $RAB_{drop}$ to cause a bit-rate reduction for. In response to this, a packet manipulation module 339 in FIG. 3 will deliberately modify the contents of the outgoing data (e.g. HS-DSCH Data Frame 400 in FIG. 4) in a way such that the TCP client 520 in the receiving UE 100 will interpret the received packets as lost or destroyed and therefore discard them. Such deliberate modification may for instance involve modifying one or more bits of the data packets 430 comprised in the MAC-d PDU 422, substituting some part of or the entire data packets 430, changing a checksum of the HS-DSCH Data Frame 400 or any data carried therein, or basically manipulating the outgoing data in any conceivable way which causes the TCP error correction/detection functionality in the TCP client 520 to regard the received data packets as lost or corrupt and therefore respond to the TCP server 500 with multiple acknowledgements of previously received data packets, thus indicating data congestion.

A refined embodiment further improves the situation towards proportional fair band-width sharing by providing the packet manipulation module 339 with functionality to deliberately distribute the packets to be dropped among different TCP sessions currently run by the determined data connection $RAB_{drop}$. To this end, the packet manipulation module 339 is provided with data decoding and analysis functionality in order to examine the individual packets in the data stream on the data connection $RAB_{drop}$ and determine the respective TCP sessions to which they belong.

The invention has been described above in detail with reference to embodiments thereof. However, as is readily understood by those skilled in the art, other embodiments are equally possible within the scope of the present invention, as defined by the appended claims.

For instance, the invention is applicable also to other networks than 3G/UMTS, including but not limited to LTE. Thus, in an alternative embodiment, the congestion control functionalities which have been described above for the RBS (Node B) 114; 510; 900 are instead implemented in an LTE radio base station which is commonly referred to as eNodeB.

The invention claimed is:

1. A method for congestion control in a network node of a communication network, said network node being adapted to handle a plurality of data connections for conveying data packets travelling between a core side and a terminal side of said communication network in compliance with an acknowledgement-based data transmission protocol for delivering a data stream from a sending host to a receiving host, the method comprising, in said network node:
   detecting a condition indicative of a congestion for any of said plurality of data connections;
   selecting, among said plurality of data connections, a data connection for which a bit-rate reduction is to be caused;
   determining a number ($X_i$) of data packets to be manipulated for the selected data connection, wherein the determined number depends on a time-integrated difference between experienced and targeted bit-rates for the selected data connection and wherein the determined number is an integer; and
   manipulating each of said determined number of data packets in a way such that the receiving host upon receipt of the manipulated data packets will respond to the sending host with an indication that the manipulated data packets have not been duly received, so as to initiate the reduction of the bit-rate for the selected data connection,
wherein said plurality of data connections are associated with respective weights, w, for Quality-of-Service (QoS) bit-rate differentiation, and wherein selecting the data connection for which a bit-rate reduction is to be caused comprises:
maintaining an average bit-rate value, $R_k$, for each individual data connection, wherein k=1-N; and
selecting the data connection for which a bit-rate reduction is to be caused as the data connection among said plurality of data connections which yields the highest value of $R_k/w_k$, wherein k, N, $R_k$, w, and $w_k$ are integers.

2. The method of claim 1, wherein detecting a condition indicative of a congestion for any of said plurality of data connections comprises monitoring sequence numbers associated with incoming data packets, wherein said condition is triggered when the monitored sequence numbers indicate that data has been lost or received out of order.

3. The method of claim 1, wherein the data connection for which a bit-rate reduction is to be caused is selected as the data connection for which the congestion-indicative condition has been detected.

4. The method of claim 1, further comprising:
for each individual data connection, maintaining the number $X_i(t)$ of data packets to be manipulated at time t in case an individual data connection is selected as said selected data connection,
wherein the number $X_i(t)$ of data packets to be manipulated is calculated based on an output from an integrating controller which as control error (e(t)) accepts a difference between experienced bit-rate and targeted bit-rate;
wherein the experienced bit-rate is the average bit-rate value, $R_i$, for said individual data connection;
wherein the targeted bit-rate is calculated as sum of the average bit-rate values, $R_k$, for all of the plurality of data connections divided by sum of weights, $w_k$, for all of the plurality of data connections, multiplied by weight $w_i$ of the individual data connection and wherein i, $R_i$, and $w_i$ are integers.

5. The method of claim 4, wherein the number $X_i(t)$ of data packets to be manipulated is calculated as:

$$X_i(t) = \max\left\{1, X_i(t-1) + C\left(R_i(t) - W_i(t)\frac{\sum_{k=1}^{N} R_k(t)}{\sum_{k=1}^{N} W_k(t)}\right) - S\right\},$$

where C is a parameter setting that influences dynamic behavior of the congestion control, and S is a small value to cause Xi(t) to drift towards 1 when the difference between experienced bit-rate and targeted bit-rate is small.

6. The method of claim 4, wherein the integrating controller also has a term that is proportional to the control error (e(t)) and provides a direct response to changes in the control error.

7. The method of claim 1, wherein:
said acknowledgement-based data transmission protocol is Transmission Control Protocol, TCP;
said sending host is a TCP server;
said receiving host is a TCP client; and
manipulating each of said determined number of data packets comprises causing the TCP client to respond to the TCP server with multiple acknowledgements of one or more data packets received prior to said determined number of data packets.

8. The method of claim 1, wherein the communication network is a transport network for a radio communication system, the network node is a radio base station, the plurality of data connections are radio access bearers, and the data packets are conveyed in payload of protocol data units (PDU) in HS-DSCH data frames.

9. A non-transitory computer-readable medium having stored thereupon a computer program, the computer program comprising computer program code that, when executed by a programmable controller of a network node that is adapted to handle a plurality of data connections for conveying data packets travelling between a core side and a terminal side of a communication network in compliance with an acknowledgement-based data transmission protocol for delivering a data stream from a sending host to a receiving host, cause the programmable controller to:
detect a condition indicative of a congestion for any of said plurality of data connections;
select, among said plurality of data connections, a data connection for which a bit-rate reduction is to be caused, wherein the programmable controller maintains an average bit-rate value, $R_k$, for each individual data connection, wherein k=1-N, and selects the data connection for which a bit-rate reduction is to be caused as the data connection among said plurality of data connections which yields the highest value of $R_k/w_k$;
determine a number ($X_i$) of data packets to be manipulated for the selected data connection, wherein the determined number depends on a time-integrated difference between experienced and targeted bit-rates for the selected data connection and wherein the determined number is an integer; and
manipulate each of said determined number of data packets in a way such that the receiving host upon receipt of the manipulated data packets will respond to the sending host with an indication that the manipulated data packets have not been duly received, so as to initiate the reduction of the bit-rate for the selected data connection, wherein said plurality of data connections are associated with respective weights, w, for Quality-of-Service (QoS) bit-rate differentiation and wherein k, N, $R_k$, w, and $w_k$ are integers.

10. A network node of a communication network, said network node being adapted to handle a plurality of data connections for conveying data packets travelling between a core side and a terminal side of said communication network in compliance with an acknowledgement-based data transmission protocol for delivering a data stream from a sending host to a receiving host, and said network node comprising:
a receiver configured to receive the data packets,
a transmitter configured to transmit the data packets, and
processing circuitry configured to:
detect a condition indicative of a congestion for any of said plurality of data connections;
select, among said plurality of data connections, a data connection for which a bit-rate reduction is to be caused, wherein the processing circuitry is configured to maintain an average bit-rate value, $R_k$, for each individual data connection, wherein k=1-N, and select the data connection for which a bit-rate reduction is to be caused as the data connection among said plurality of data connections which yields the highest value of $R_k/w_k$;

determine a number ($X_i$) of data packets to be manipulated for the selected data connection, wherein the determined number depends on a time-integrated difference between experienced and targeted bit-rates for the selected data connection and wherein the determined number is an integer; and manipulate each of said determined number of data packets in a way such that the receiving host upon receipt of the manipulated data packets will respond to the sending host with an indication that the manipulated data packets have not been duly received, so as to initiate the reduction of the bit-rate for the selected data connection, wherein the plurality of data connections are associated with respective weights, w, for Quality-of-Service (QoS) bit-rate differentiation and wherein k, N, $R_k$, w, and $w_k$ are integers.

* * * * *